W. A. GREENLAW.
FLEXIBLE PIPE JOINT.
APPLICATION FILED JAN. 23, 1908.

939,908.

Patented Nov. 9, 1909.

Witnesses:
Nathan C. Lombard
Edna E. Cleveland

Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING CO., OF BOSTON, MASSACHUSETTS, A CORPORATION OF MAINE.

FLEXIBLE PIPE-JOINT.

939,908.  Specification of Letters Patent.  Patented Nov. 9, 1909.

Application filed January 23, 1908. Serial No. 412,287.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its principal object the reduction to a minimum of the friction between the movable member and the other pipe member with which it co-acts.

The invention consists in certain novel features of construction and arrangement of parts which will be readily understood by reference to the description of the drawings and to the claims hereinafter given.

Figure 1:
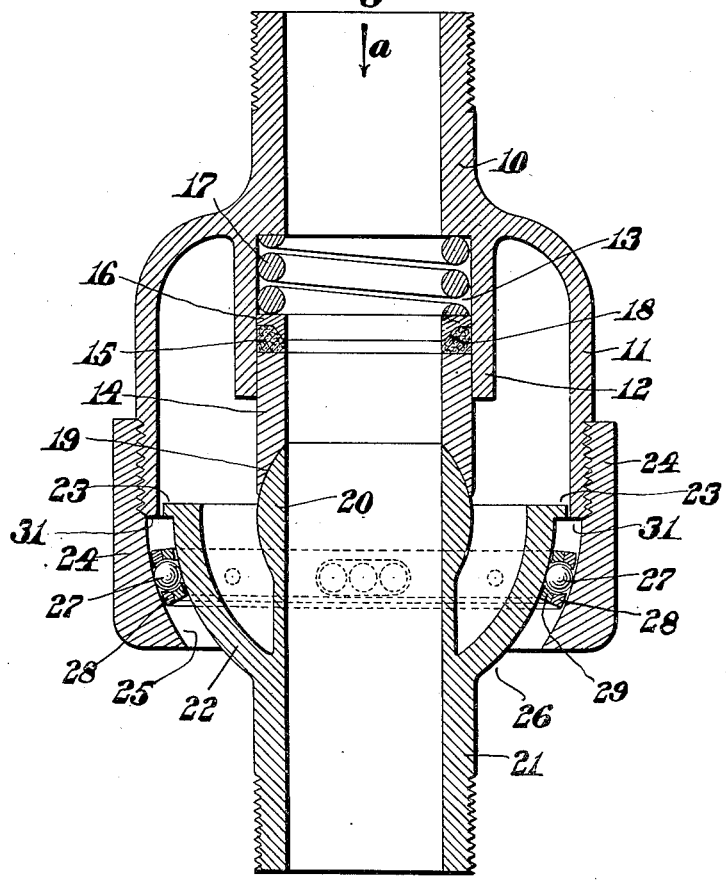
Figure 3:
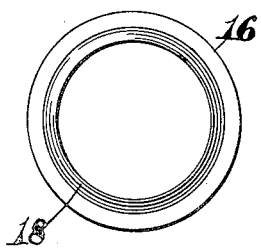
Figure 2:
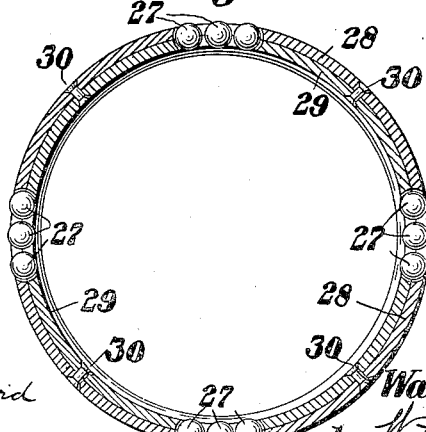
Figure 4:
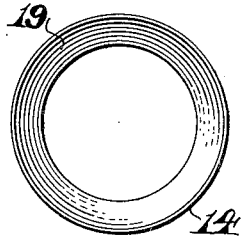

Of the drawings: Figure 1 represents a central vertical section through a pipe joint embodying the features of this invention. Fig. 2 represents a section through the cage for supporting the anti-friction member. Fig. 3 represents an inverted plan of the packing follower, and Fig. 4 represents an inverted plan of the removable ball stop.

Similar characters designate like parts throughout the several figures of the drawings.

In the drawings, 10 represents a pipe member provided with the cup-shaped end 11 and the tubular extension 12 the center of which forms a chamber 13 in which is nicely fitted the tubular ball stop 14. Against the inner end of this ball stop 14 is an annular packing 15 and on the opposite side of said packing is an annular follower 16 forced against the inner end of the movable ball stop 14 by means of the spring 17 bearing against the bottom of said chamber 13. The annular follower 16 is provided with an annular flange 18 having an inclined wall which is adapted to force the packing 15 outwardly against the walls of said chamber 13 by the action of the spring 17 upon the follower 16.

The outer end of the ball stop 14 is provided with a semi-spherical recess 19 adapted to furnish a seat for the ball end 20 of the pipe member 21. This member 21 is provided with a semi-spherical apron 22 concentric with the ball end 20, the end of said apron being provided with an outwardly extending flange 23. Threaded to the outer end of the cup-shaped member 11 is a cap 24 having a semi-spherical inner wall 25 which when in position is concentric with the apron 22 and ball 20 and slightly removed from the outer wall 26 of the former.

In the space between the outer wall 26 of the apron 22 and the inner wall 25 of the cap 24 are a plurality of anti-friction members such as balls 27, these balls being retained in position by means of pockets formed in the annular rings 28 and 29 riveted together at 30. These rings 28 and 29 are made semi-spherical so as to conform to the semi-spherical space between the apron 22 and the cap 24 and the balls 27 contained within said cage 28 and 29 extend slightly beyond the outer walls thereof so that the cage itself is prevented from contacting with either wall 25 or 26, the only contact against the walls being the balls or anti-friction members 27. The outer ends 31 of the cup-shaped end 11 and the flange 23 limit the movement of the floating cage 28—29 when the pipe member 21 is moved about the center of the ball end 20.

By such a construction as is herein shown, the friction between the various parts is reduced to a minimum, this being quite essential when the agent passing through the pipe joint passes in the direction of the arrow "a" on Fig. 1. Without the anti-friction members 27, when the steam or other agent is passing through the pipe joint in the direction of the arrow "a" and the member 21 is at an angle to the member 10, the action of this agent upon the pipe member 21 would be such as to cause such friction between the bearing portion of the member 21 and the bearing portion of the cap 24 which retains it in position, that it would be extremely difficult to move the member 21 to another angle or to its normal position, as shown in Fig. 1. By supplying the floating cage as has been heretofore described with the anti-friction members contained therein this excess of friction between these members is wholly avoided and the member 21 may be readily moved to any desired angle.

The removable ball stop 14 is accurately fitted to the interior of the chamber 13 and the packing behind it is forced outwardly by the inclined wall 18 on the follower 16 to prevent the steam or other agent passing through the pipe 10 from escaping into the interior of the cup-shaped end 11.

The spring 17 behind the removable ball stop 14 permits the ball end 20 to readily move into position so that its center registers with the center of the semi-spherical wall 25.

The operation and advantages of a pipe joint as herein constructed it is believed will be fully apparent from the foregoing without any further description.

Having thus described my invention, I claim:

1. In a flexible pipe joint, the combination of a pipe member provided with a cup-shaped end; a second pipe member provided with a ball-shaped end and a semi-spherical apron having an outwardly projecting flange at its end; a stop for said ball end supported by the first-mentioned pipe member; a cap secured to the first-mentioned pipe member and provided with a semi-spherical inner wall; and anti-friction members interposed between said wall and said apron, movable in a path concentric to said semi-spherical apron and limited in movement in one direction by said outwardly projecting flange.

2. In a flexible pipe joint, the combination of a pipe member provided with a cup-shaped end; a second pipe member provided with a ball-shaped end and a semi-spherical apron; a cap secured to the first-mentioned pipe member and provided with a semi-spherical inner wall; anti-friction members interposed between said wall and said apron; a cage to retain said anti-friction members; and shoulders on said pipe members to limit the movement of said cage.

3. In a flexible pipe joint, the combination of a pipe member provided with a cup-shaped end having a cylindrical chamber and a tubular extension within said cup-shaped end; a spring-pressed tubular member within said chamber provided with a semi-spherical recess at one end; a second pipe member provided with a ball end adapted to fit said recess and a semi-spherical apron concentric with said ball end; a cap secured to the first-mentioned pipe member for retaining said ball end to its seat; a plurality of anti-friction members interposed between said cap and said apron; a cage for retaining said anti-friction members in position; and shoulders on said pipe members for limiting the movement of said cage about the center of said ball.

Signed by me at No. 7 Water st., Boston, Mass., this 20th day of January, 1908.

WARREN A. GREENLAW.

Witnesses:
 EDNA C. CLEVELAND,
 WALTER E. LOMBARD.